UNITED STATES PATENT OFFICE.

JAKOB SCHMID, OF BASLE, SWITZERLAND, ASSIGNOR TO SOCIETY OF CHEMICAL INDUSTRY IN BASLE, OF SAME PLACE.

BLUE TETRAZO DYE AND PROCESS OF MAKING SAME.

SPECIFICATION forming part of Letters Patent No. 620,368, dated February 28, 1899.

Application filed July 2, 1898. Serial No. 685,004. (Specimens.)

*To all whom it may concern:*

Be it known that I, JAKOB SCHMID, chemist and doctor of philosophy, a citizen of the Swiss Republic, and a resident of Basle, Switzerland, have invented certain Improvements in the Manufacture of Blue Tetrazo Dyes, of which the following is a clear and complete specification.

My invention relates to the manufacture of new mixed tetrazo dyestuffs dyeing unmordanted cotton in bright reddish-blue to greenish-blue shades by forming the intermediate product from one molecule of a naphthacetoldisulfo-acid and one molecule of the tetrazo derivative of a paradiamin of the series of diphenyl and combining this new not-further-diazotizable intermediate product with one molecule of a naphtholic compound, as naphtholsulfo-acids, naphthols, and oxynaphthols.

I. *Production of the naphthacetoldisulfo-acid.*—Five parts of the 1:8:3:6 amidonaphtholdisulfonate of sodium, well dried and finely powdered, are mixed with 1.5 parts of anhydrous sodium acetate, 2.5 parts of acetic anhydrid, and two parts of glacial acetic acid. The mixture is boiled gently in an oil-bath, the vessel being provided with a reflux condenser, until a sample withdrawn from the mixture and dissolved in water no longer gives a color when treated with a little acid and sodium nitrite and on addition of a solution of sodium carbonate. The product of the reaction obtained in this way consists principally of a mixture of the sodium salts of the required 1:8:3:6 naphthacetoldisulfonic acid and of a diacetamidonaphtholdisulfonic acid, and sometimes even of this last acid alone if the acetylization has occurred very energetically. Unlike the naphthacetoldisulfonic acid, which combines easily with diazo compounds, yielding extremely beautiful azo coloring-matters, this diacetamidonaphtholdisulfonic acid is indifferent toward diazo compounds, and is consequently valueless for the preparation of azo coloring-matters.

The diacetylized acid can be at once easily and quantitatively transformed into naphthacetoldisulfonic acid by heating it either by itself or mixed with the naphthacetoldisulfonic acid, with some alkali or dilute acid, or even by mere prolonged boiling with water. To this end the mixture from the reaction after the acetic acid has been distilled away is dissolved in water and heated for a short time at a temperature of from 80° to 90° centigrade with a five-per-cent. solution of sodium carbonate. On account of its great solubility naphthacetoldisulfonic acid can only be isolated with great difficulty and with considerable loss of material. It is therefore most advantageously kept in solution for its diverse uses.

If in the foregoing example for the 1:8:3:6 amidonaphtholdisulfonic acid there be substituted 1:8:4:6, 1:8:2:4, or 1:5:3:7 amidonaphtholdisulfonic acid, there will be obtained in an analogous manner 1:8:4:6, 1:8:2:4, or 1:5:3:7 naphthacetoldisulfonic acid. The proportions and the duration and temperature of heating may be varied within sufficiently wide limits.

The naphthacetoldisulfonic acids are characteristically distinct from the amidonaphtholsulfonic acids, from which they are derived. While the amidonaphtholsulfonic acids are soluble in water with difficulty relatively, the naphthacetolsulfonic acids are very soluble and are precipitated by acids only from concentrated solutions of their salts, and not therefore under the conditions under which the amidonaphtholdisulfonic acids are precipitated. This difference of solubility therefore may be used for separating the naphthacetoldisulfonic acids from their mixture with amidonaphtholdisulfonic acids.

The naphthacetoldisulfonic acids and the azo coloring-matters derived from them are not diazotized by nitrous acid. With diazo compounds they yield both in alkaline and feebly acid solution one and the same series of coloring-matters, while the amidonaphtholdisulfonic acids yield under these conditions two distinct series of coloring-matters. Thus the naphthacetoldisulfonic acids react only with one molecular proportion of a diazo compound.

The coloring-matters derived from naphthacetoldisulfonic acids are of a more brilliant and pure tint than the analogous coloring-matters from the amidonaphtholdisulfonic acids, are resistant to acids, and are not altered by dilute solutions of nitrous acid.

II. *Production of the intermediate product.*—2.44 parts of dianisidin are diazotized in the usual manner by means of 5.5 parts of hydrochloric acid and 4.6 parts of a thirty-per-cent. solution of sodium nitrite. The solution of the tetrazo compound thus obtained is introduced into a cold aqueous solution of 3.6 parts of naphthacetoldisulfonic acid containing an excess of sodium carbonate or sodium acetate. The larger part of the intermediate product thus formed remains in dark-colored solution. The dianisidin may be replaced by another paradiamin of the series of diphenyl, such as tolidin or benzidin, in which cases the intermediate product separates out in the form of a dark mass.

III. *Production of the coloring-matter.*—As soon as in the foregoing preparation of the intermediate product the free tetrazo body has disappeared there are introduced into the mass 2.5 parts of 1:4 naphtholsulfo-acid, and the formation of the coloring-matters is effected by agitating the mixture for some hours and then heating up. The coloring-matter is precipitated by common salt filtered, pressed, and dried. Instead of 1:4 naphtholsulfo-acid another naphtholic compound—as, for instance, 1:5 naphtholsulfo-acid, 2:6 naphtholsulfo-acid, alpha-naphthol, beta-naphthol, 2:6 or 2:7 oxynaphthol, &c.—may be employed.

The new coloring-matter constitutes in dry state a bronze-like powder, insoluble in alcohol, ether, and benzene, soluble in water with a violet-blue coloration and in concentrated sulfuric acid with a greenish-blue coloration. It dyes unmordanted cotton very pure tints, varying from reddish to greenish blue, and is not modified by nitrous acid either in solution or on the fiber.

What I claim is—

1. The process for the manufacture of blue coloring-matters by forming the intermediate product from one molecule of a naphthacetoldisulfo-acid and one molecule of the tetrazo derivative of a paradimin of the series of diphenyl and combining the intermediate product thus obtained with one molecule of a naphtholic compound.

2. As a new article of manufacture, the herein-described new coloring-matter, which contains the radical of a naphthacetoldisulfo-acid, constitutes in dry state a bronze-like powder, soluble in water with a violet-blue color, in concentrated sulfuric acid with a greenish-blue color, insoluble in alcohol, ether and benzene, is not modified by the action of nitrous acid, either in solution or on the fiber, and dyes unmordanted cotton very pure reddish to greenish blue tints.

In witness whereof I have hereunto signed my name, this 18th day of June, 1898, in the presence of two subscribing witnesses.

JAKOB SCHMID.

Witnesses:
GEORGE GIFFORD,
AMAND RITTER.